United States Patent
Fu et al.

(10) Patent No.: US 10,555,194 B2
(45) Date of Patent: Feb. 4, 2020

(54) METHOD AND APPARATUS FOR CHANNEL STATE INFORMATION REPORTING

(71) Applicants: Samsung Electronics Co., Ltd., Gyeonggi-do (KR); BEIJING SAMSUNG TELECOMMUNICATIONS TECHNOLOGY RESEARCH CO., LTD., Beijing (CN)

(72) Inventors: Jingxing Fu, Beijing (CN); Yingyang Li, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 16 days.

(21) Appl. No.: 15/735,382

(22) PCT Filed: Jul. 5, 2016

(86) PCT No.: PCT/KR2016/007228
§ 371 (c)(1),
(2) Date: Dec. 11, 2017

(87) PCT Pub. No.: WO2017/010721
PCT Pub. Date: Jan. 19, 2017

(65) Prior Publication Data
US 2018/0184310 A1    Jun. 28, 2018

(30) Foreign Application Priority Data
Jul. 10, 2015  (CN) ............................ 2015 1 0404318

(51) Int. Cl.
*H04W 24/08*    (2009.01)
*H04L 5/00*    (2006.01)
(Continued)

(52) U.S. Cl.
CPC .......... *H04W 24/08* (2013.01); *H04B 7/0632* (2013.01); *H04L 5/0048* (2013.01);
(Continued)

(58) Field of Classification Search
None
See application file for complete search history.

(56) References Cited

U.S. PATENT DOCUMENTS 9,936,410 B2 *    4/2018    Su .................. H04B 7/0626
2013/0028182 A1    1/2013    Geirhofer et al.
(Continued)

OTHER PUBLICATIONS

PCT/ISA/210 Search Report issued on PCT/KR2016/007228 (pp. 6).
(Continued)

*Primary Examiner* — Anh Ngoc M Nguyen
(74) *Attorney, Agent, or Firm* — The Farrell Law Firm, P.C.

(57) ABSTRACT

The present disclosure provides a method for reporting channel state information (CSI), a first set of channel state information-reference signals (CSI-RSs) sent from a base station is measured to obtain a first set of CSI, and the first set of CSI obtained is reported to the base station. A second set of CSI-RSs sent from the base station is measured based on the first set of CSI to obtain a second set of CSI, and the second set of CSI obtained is reported to the base station, in which the second set of CSI-RSs is precoded CSI-RSs determined based on the first set of CSI.

20 Claims, 7 Drawing Sheets

(51) Int. Cl.
    *H04B 7/06*    (2006.01)
    *H04W 24/10*   (2009.01)
    *H04W 88/08*   (2009.01)
(52) U.S. Cl.
    CPC .......... *H04L 5/0057* (2013.01); *H04W 24/10* (2013.01); *H04W 88/08* (2013.01)

(56) References Cited

U.S. PATENT DOCUMENTS

| | | |
|---|---|---|
| 2013/0258954 A1 | 10/2013 | Khoshnevis et al. |
| 2013/0336214 A1 | 12/2013 | Sayana et al. |
| 2015/0003325 A1 | 1/2015 | Sajadieh et al. |
| 2015/0030006 A1* | 1/2015 | Fujio .................... H04B 7/0456 370/336 |
| 2017/0104517 A1* | 4/2017 | Kakishima ........... H04B 7/0456 |

OTHER PUBLICATIONS

PCT/ISA/237 Written Opinion issued on PCT/KR2016/007228 (pp. 6).
3GPP TSG RAN WG1 Meeting #81, Fukuoka, Japan, May 25-29, 2015, Discussion on beamformed CSI-RS-based scheme for EBF/FD-MIMO, pp. 7.

* cited by examiner

[Fig. 1]
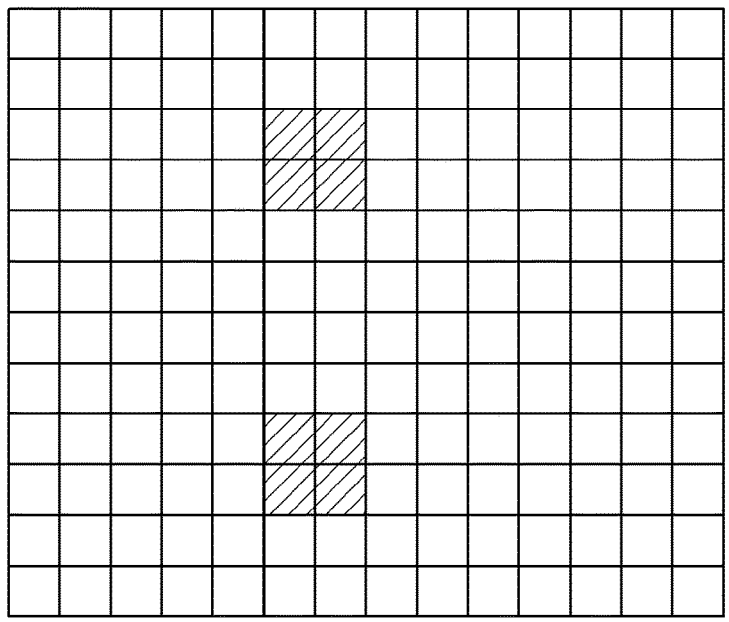
[Fig. 2]
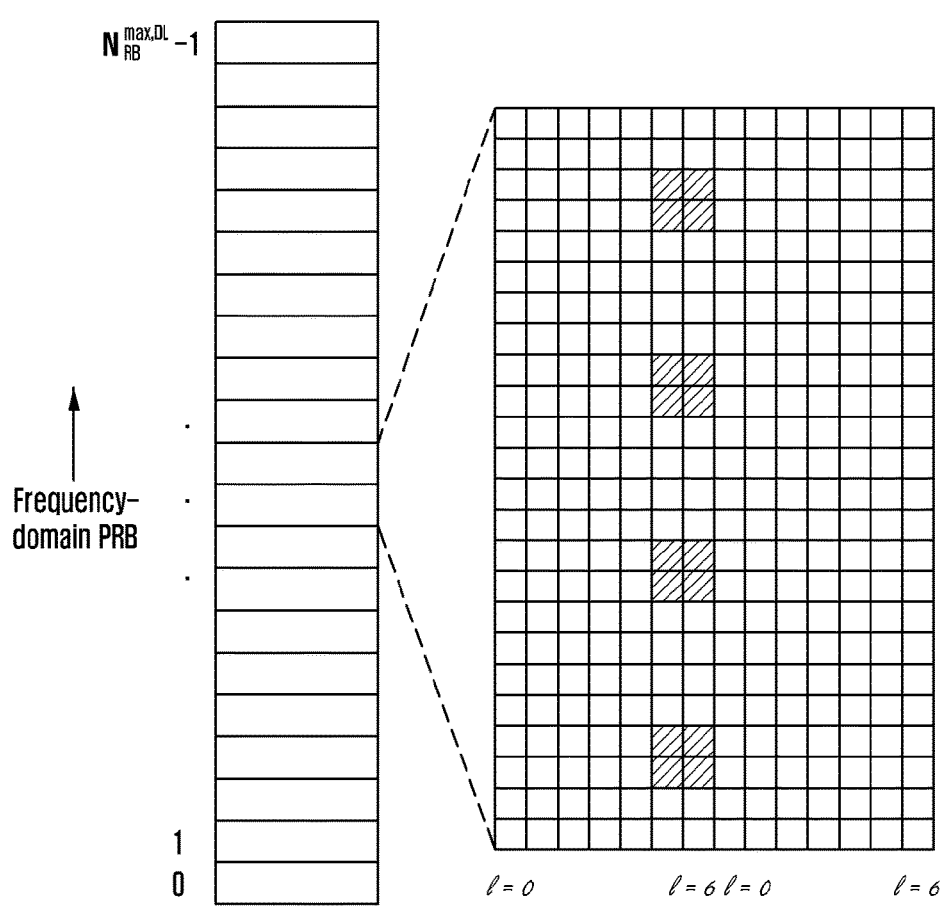
 CSI RS

[Fig. 3]
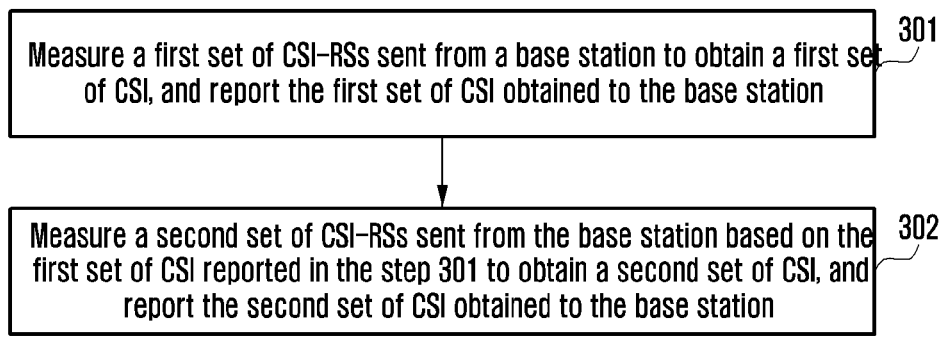
[Fig. 4]
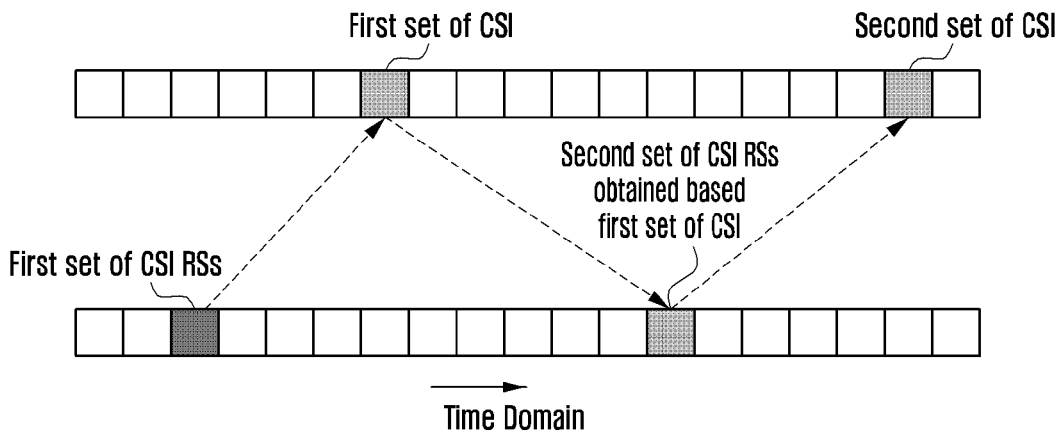

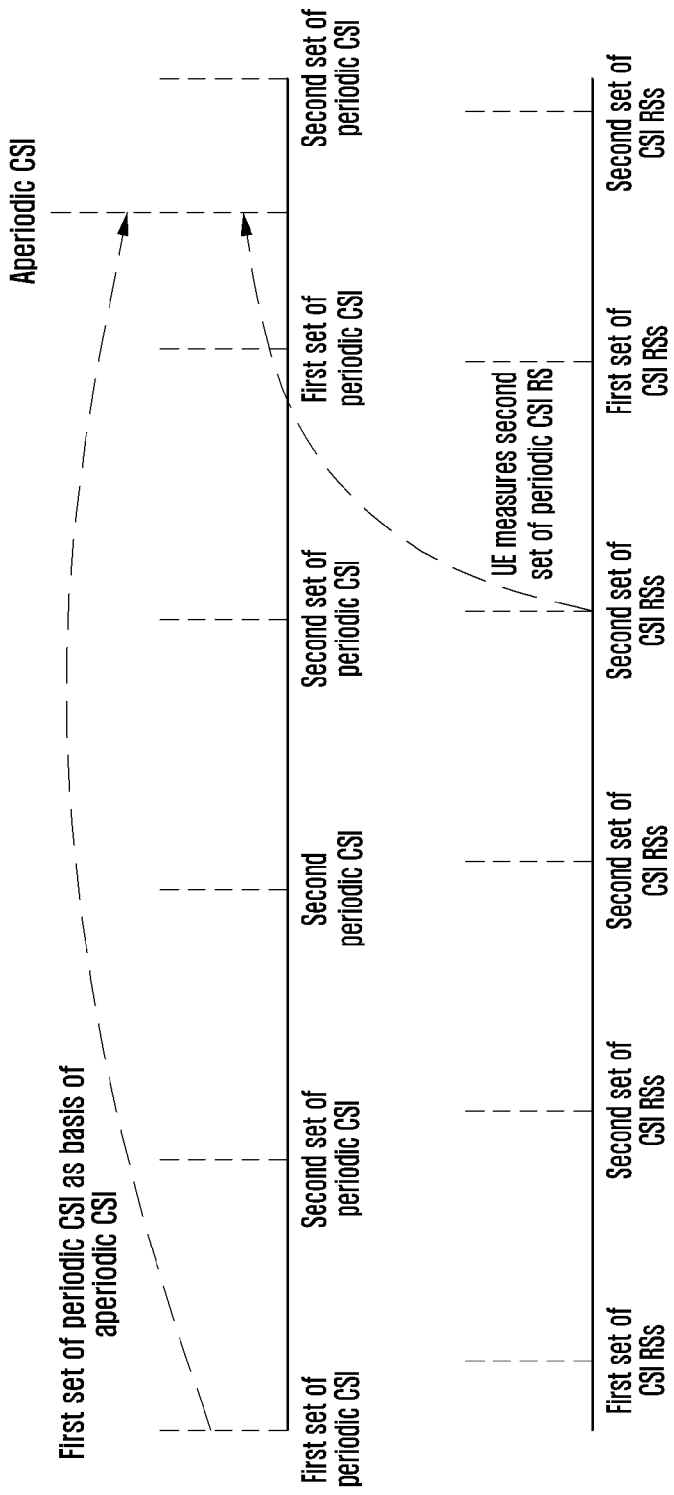
[Fig. 5]

[Fig. 6]
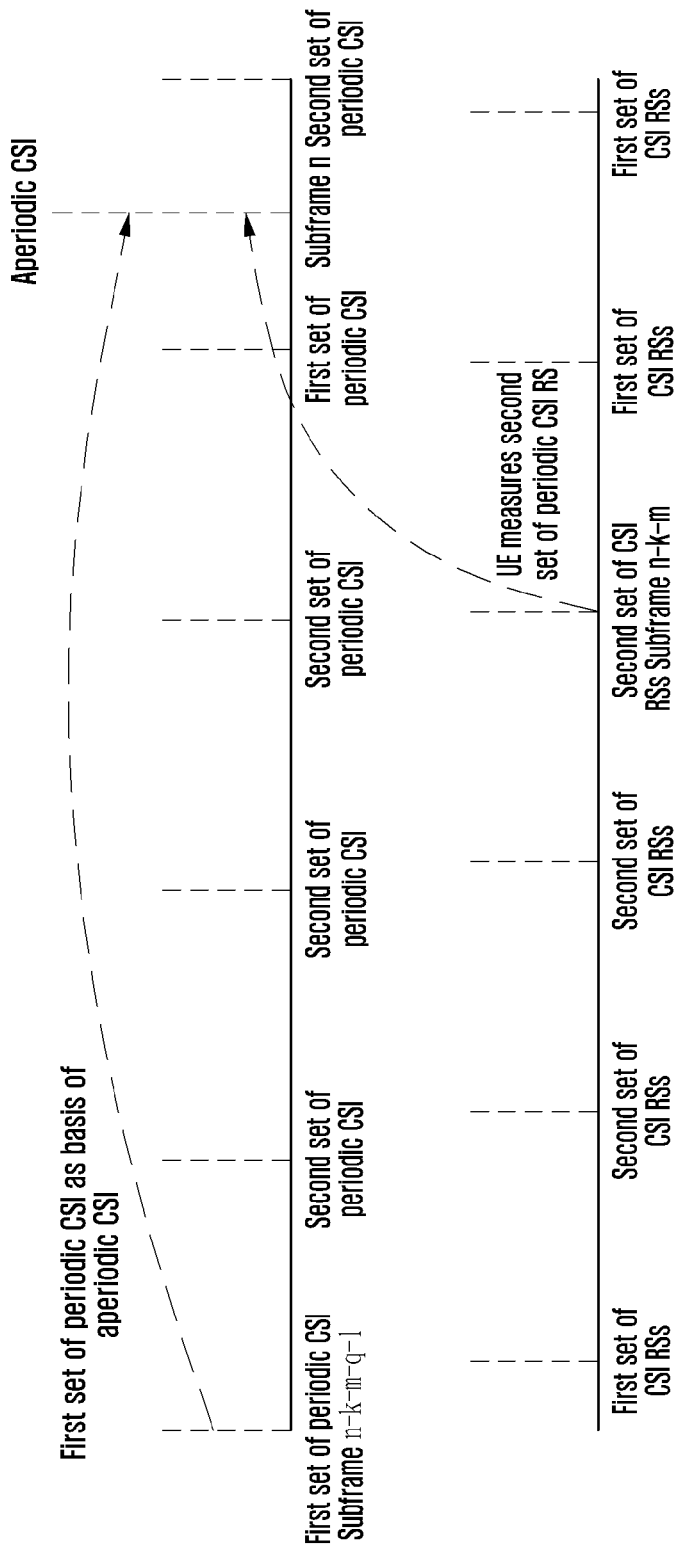

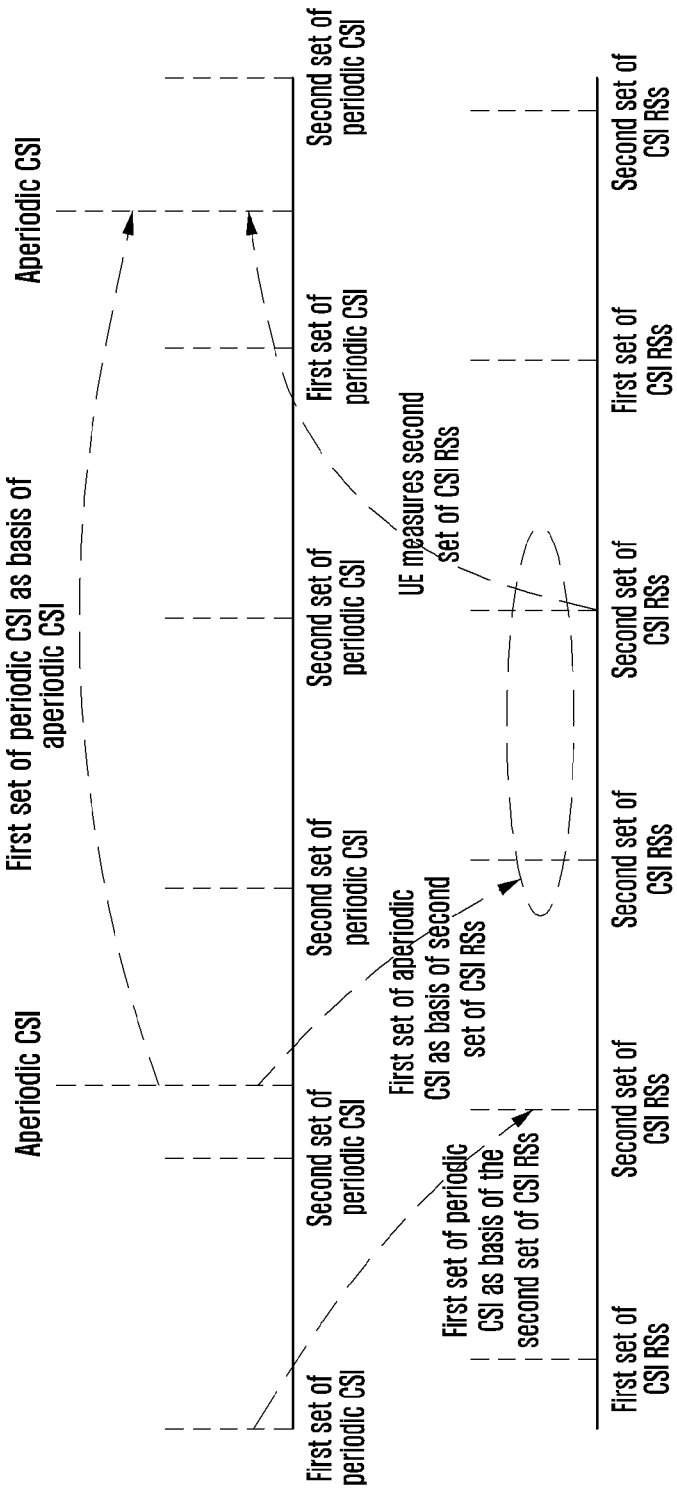
[Fig. 7]

[Fig. 8]
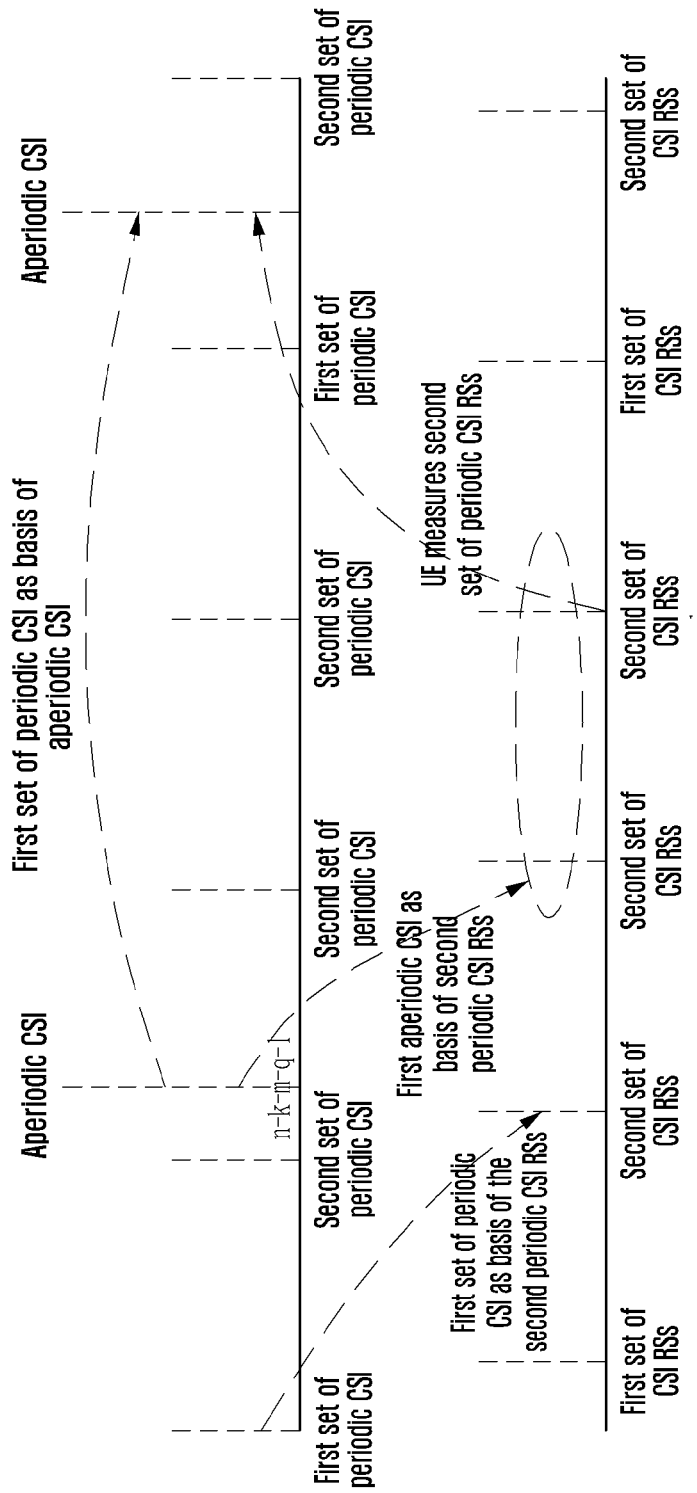

[Fig. 9]
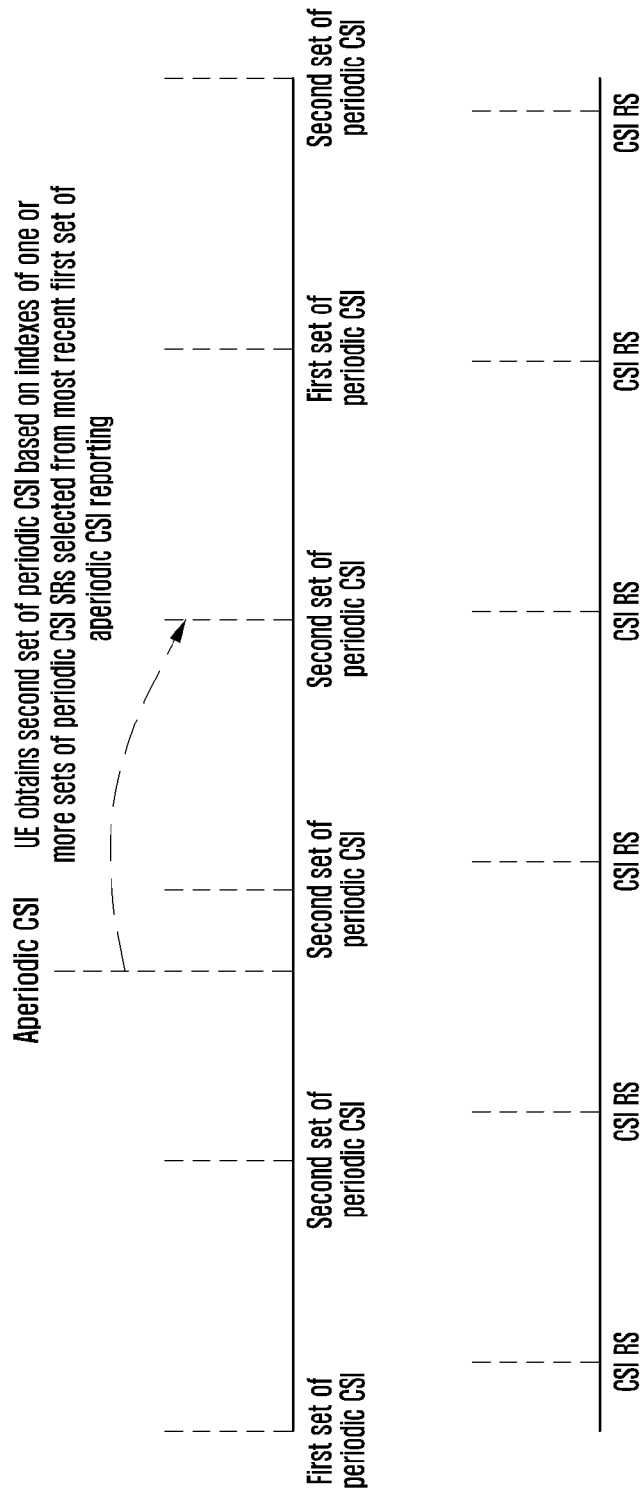
[Fig. 10]

METHOD AND APPARATUS FOR CHANNEL STATE INFORMATION REPORTING

PRIORITY

This application is a National Phase Entry of International Application No. PCT/KR2016/007228 which was filed on Jul. 5, 2016, and claims priority to Chinese Patent Application No. 201510404318.0, which was filed on Jul. 10, 2015, the content of each of which is incorporated herein by reference.

TECHNICAL FIELD

The present disclosure relates to radio communications and in particular to a method and an apparatus for channel state information reporting in a multi-antenna radio communication system.

BACKGROUND ART

In a long term evolution advanced (LTE-A) system, to improve throughput of cells and eliminate interference between subscribers, each cell may be configured with 16, 32, 64, or more transmitting antennas to perform beam shaping. A base station configures channel state information reference signals (CSI-RSs) for each user equipment (UE). Each UE uses the CSI-RSs to measure channel state information (CSI) of a channel, and then provides feedback to the base station. Since before the 3rd Generation Partnership Project (3GPP) release 12, a CSI-RS design is made based on the actual number of physical antennas, and up to 8 ports are involved in a CSI-RS before 3GPP release 12, therefore, each physical resource block may occupy up to 8 resource units, as shown in FIG. 1. However, currently, the number of physical antennas has largely increased, and if the number of CSI-RS ports is still designed based on the number of physical antennas, resources occupied by CSI-RSs in each physical resource block will significantly increase. Thus, it is an issue yet to be solved regarding how to reduce resources occupied by CSI-RSs as many as possible.

In a LTE-A system, CSI-RS resources are configured for UEs to measure channel state information which consists of rank indicator (RI), channel quality indicator (CQI), precoding matrix indicator (PMI), etc. At present, when CSI-RSs are sent from a base station to a UE, corresponding raw signals of the CSI-RSs are directly transmitted within an overall downlink system bandwidth, as shown in FIG. 2. By measuring the CSI-RSs, the UE obtains channel state information consisting of RI, CQI, and PMI. To be specific, a method to measure a CQI is first measuring the CSI-RSs to estimate channel information, and then assuming that specified PMI and RI are used to measure a corresponding CQI at a signal transmitting end, i.e., the CQI being measured based on the specified PMI.

When the number of antennas in the system increases rapidly, CSI-RS resources needed also increase rapidly. Therefore, it is necessary to provide channel state information to the base station as detailedly as possible, and meanwhile reduce occupation of CSI-RS resources as much as possible. By precoding CSI-RSs, CSI-RS transmission performance can be improved, which further improves accuracy of reference signal channel estimation, and improves system performance. In addition, by precoding the CSI-RSs, the number of CSI-RS ports can be reduced, so as to reduce resources occupied by the CSI-RSs. Here, a CSI-RS is precoded using a precoding matrix before it is sent to a UE, and therefore, channel information estimated out based on a CSI-RS measurement is equivalent channel information. Through this equivalent channel information, channel state information (consisting of RI, PMI, and CQI) with the precoding matrix being used can be obtained. Therefore, it is necessary to provide an effective technical scheme to provide suitable CSI-RS resource configuration.

DISCLOSURE OF INVENTION

Technical Problem

The present disclosure is to solve some defects existing in traditional art, and especially by precoding CSI-RSs, to improve system performance. In view of this, an objective of the present disclosure is to provide schemes for reporting aperiodic CSI in a multi-antenna radio communication system to optimize system performance.

Solution to Problem

To achieve the objective, the present disclosure provides a method for reporting CSI, including:

measuring a first set of CSI-RSs sent from a base station to obtain a first set of CSI, and reporting the first set of CSI obtained to the base station; and measuring a second set of CSI-RSs sent from the base station based on the first set of CSI to obtain a second set of CSI, and reporting the second set of CSI obtained to the base station, in which the second set of CSI-RSs is precoded CSI-RSs determined based on the first set of CSI.

The first set of CSI and/or the second set of CSI is reported to the base station as aperiodic CSI.

The base station is configured with two sets of CSI-RSs, in which the first set of CSI-RSs is raw CSI-RSs, and the second set of CSI-RSs is CSI-RSs precoded using channel information determined from the first set of CSI;

in which the first set of CSI at least includes one of the following: RI, CQI, or PMI, and the second set of CSI at least includes one of the following: RI, CQI, or PMI.

The base station is configured with multiple sets of CSI-RSs and corresponding indexes and precoding matrixes of the multiple sets of CSI-RSs, and the first set of CSI-RSs sent by the base station is all precoded CSI-RSs configured;

the first set of CSI is an index or indexes of one or more sets of CSI-RSs selected by measuring the multiple sets of CSI-RSs;

the second set of CSI-RSs is precoded CSI-RSs corresponding to the index or the indexes included in the first set of CSI; and the second set of CSI is a RI and/or a PMI and/or CQI obtained after measuring the second set of CSI-RSs.

The aperiodic CSI only comprises the second set of CSI; the first set of CSI is periodically reported;

a way to report the aperiodic CSI includes: obtaining the second set of CSI by measuring the second set of CSI-RSs in a subframe n-k or in a nearest subframe n-k-m that transmits the second set of CSI-RSs before the subframe n-k and the first set of CSI reported in a subframe n-k-m-q or in a nearest subframe n-k-m-q-l that reports the first set of CSI before the subframe n-k-m-q, and reporting the second set of CSI in a subframe n as the aperiodic CSI; where n is an index of a subframe for reporting the aperiodic CSI, k is a preset positive integer, m is a positive integer larger than or equal to 0, q is a preset positive integer, l is a positive integer larger than or equal to 0.

Whether to perform aperiodic CSI reporting is determined according to indication information sent from the base station.

The aperiodic CSI includes the first set of CSI and the second set of CSI; the indication information sent from the base station is a value of a CQI request field, and in response to determining that the value of the CQI request field is a first value, determining that the aperiodic CSI reporting is not performed; or in response to determining that the value of the CQI request field is a second value, determining that the aperiodic CSI reporting is performed; or CSI included in the aperiodic CSI is configured by a higher layer; and the indication information sent from the base station is a value of the CQI request field, and in response to determining that the value of the CQI request field is the first value, determining that the aperiodic CSI reporting is not performed; and in response to determining that the value of the CQI request field is the second value, determining that aperiodic CSI configured by the higher layer is reported; and the aperiodic CSI configured by the higher layer is the first set of CSI and/or the second set of CSI.

The aperiodic CSI includes the first set of CSI, and a way to report the first set of CSI included in the aperiodic CSI includes: receiving and measuring the first set of CSI-RSs which is transmitted in a subframe n-k or in a nearest subframe n-k-m that transmits the first set of CSI-RSs before the subframe n-k, to obtain the first set of CSI, and reporting the first set of CSI in a subframe n to the base station as the aperiodic CSI; where n is an index of a subframe to report the aperiodic CSI, k is a preset positive integer, and m is a positive integer larger than or equal to 0.

The aperiodic CSI includes the second set of CSI, and a way to report the second set of CSI included in the aperiodic CSI includes:

obtaining and reporting the second set of CSI included in the aperiodic CSI by measuring the first set of CSI periodically reported and the second CSI-RSs sent from the base station.

The aperiodic CSI includes the first set of CSI and the second set of CSI, and a way to report the second set of CSI included in the aperiodic CSI includes:

obtaining the second set of CSI based on the second set of CSI-RSs transmitted in the subframe n-k or in a nearest subframe n-k-m that transmits the second set of CSI-RSs before the subframe n-k and the first set of CSI reported in a subframe n-k-m-q or a nearest subframe n-k-m-q-l that reports the first CSI before the subframe n-k-m-q among all first sets of CSI reported periodically or aperiodically; and reporting the second set of CSI in a subframe n as the aperiodic CSI; where n is an index of a subframe to report the aperiodic CSI, k is a preset positive integer, m is a positive integer larger than or equal to 0, q is a preset positive integer, and l is a positive integer larger than or equal to 0.

The second set of CSI is reported as periodic CSI; and the first set of CSI as a basis of reporting the second set of CSI in the periodic CSI is:

a first set of CSI that has an interval larger than or equal to subframes before the second set of CSI periodically reported this time, and is the nearest to the second set of CSI periodically reported this time; where k is a preset positive integer.

An apparatus for reporting CSI, including a first set of CSI measuring and reporting unit, a storage unit, and a second set of CSI measuring and reporting unit, in which the first set of CSI measuring and reporting unit is to measure a first set of CSI-RSs sent from a base station to obtain a first set of CSI, and report the first set of CSI obtained to the base station;

the storage unit is to save the first set of CSI obtained; and the second set of CSI measuring and reporting unit is to measure a second set of CSI-RSs sent from the base station based on the first set of CSI saved to obtain a second set of CSI, and report the second set of CSI obtained to the base station; in which the second set of CSI-RSs is precoded CSI-RSs determined based on the first set of CSI.

Advantageous Effects of Invention

In the schemes provided according to the present disclosure, by precoding CSI-RSs, system performance can be improved, and resources occupied by the CSI-RSs can be largely saved in practical implementations, so that more downlink physical resources can be used for physical downlink shared channel (PDSCH) transmission, and thus throughput of downlink services is improved. Since the schemes would not change traditional systems much, thus system compatibility will not be affected, and they can be implemented simply and efficiently.

BRIEF DESCRIPTION OF DRAWINGS

FIG. 1 is a schematic diagram illustrating a structure of CSI-RS physical resources in each PRB;

FIG. 2 is a schematic diagram illustrating a structure of CSI-RS physical resources within a system bandwidth;

FIG. 3 is a flowchart illustrating a CSI reporting method according to the present disclosure;

FIG. 4 is a schematic diagram illustrating periodic CSI reporting;

FIG. 5 is a schematic diagram illustrating aperiodic CSI reporting;

FIG. 6 is a schematic diagram illustrating aperiodic CSI reporting;

FIG. 7 is a schematic diagram illustrating aperiodic CSI reporting;

FIG. 8 is a schematic diagram illustrating aperiodic CSI reporting;

FIG. 9 is a schematic diagram illustrating periodic CSI reporting; and

FIG. 10 is a schematic diagram illustrating a basic structure of a CSI reporting apparatus according to the present disclosure.

MODE FOR THE INVENTION

For better understanding of the objects, technical solutions, and advantages of the present disclosure, the present disclosure will be described more fully hereinafter with reference to the accompanying drawings and embodiments.

In specific processing, a base station transmits a CSI-RS to a UE. The UE measures the received CSI-RS to obtain CSI, and reports CSI. By precoding the CSI-RS, CSI-RS transmission performance can be improved, which further improves accuracy of reference signal channel estimation and improves system performance. Meanwhile, by precoding the CSI-RS, resources occupied by the CSI-RS can also be saved. A precoding matrix for precoding the CSI-RS may be obtained according to reciprocity of uplink and downlink channels, or may be obtained by measuring another set of CSI-RSs which is not precoded and then providing feedback to the base station. Since before the CSI-RS is sent to the UE, it is precoded using the precoding matrix, therefore, channel information estimated out by measuring the CSI-RS is equivalent channel information. Through this equivalent channel information, channel state information after the precoding matrix is used can also be obtained. Channel state information consists of at least one of the following: RI, PMI, or CQI. Since a precoded CSI-RS may be transmitted periodically, or may be transmitted aperiodically, then reporting of obtained CSI may also be categorized into a periodic CSI report and an aperiodic CSI report. A periodicity and a time offset of a periodic CSI report may be configured by higher layers, and an aperiodic CSI report may be driven by physical layer signaling.

FIG. 3 is a flowchart illustrating a CSI reporting method according to embodiments of the present disclosure. As shown in FIG. 3, the method includes the following steps:

Step 301, a first set of CSI-RSs sent from a base station is measured to obtain a first set of CSI, and the first set of CSI obtained is reported to the base station.

Step 302, a second set of CSI-RSs sent from the base station is measured based on the first set of CSI reported in the step 301 to obtain a second set of CSI, and the second set of CSI obtained is reported to the base station.

When the first set of CSI and the second set of CSI are reported in the steps 301 and 302, the first set of CSI and/or the second set of CSI may be reported aperiodically. That is, the first set of CSI and/or the second set of CSI may be reported to the base station as aperiodic CSI. Of cause, during aperiodic reporting of the first set of CSI and/or the second set of CSI, the first set of CSI and the second set of CSI may be reported periodically.

In addition, in the present disclosure, the second set of CSI-RSs transmitted from the base station is determined based on the first set of CSI obtained and reported by the UE, and the second set of CSI-RSs is precoded. In this way, CSI-RSs can be precoded efficiently and CSI-RS transmission performance can be improved. There are various ways to determine the second set of CSI-RSs based on the measurement result of the first set of CSI. In the following, two ways are provided as examples according to the embodiments of the present disclosure.

1. The first set of CSI-RSs transmitted from the base station is raw CSI-RSs without being precoded. After the UE receives and measures the first set of CSI-RSs, the UE obtains corresponding channel state information, i.e., RI and/or PMI and/or CQI. Then the UE reports this channel state information to the base station as the first set of CSI. After the base station receives the first set of CSI, the base station determines transmitting ports, a precoding matrix, etc. for the second set of CSI-RSs and determines the second set of CSI-RSs after being precoded based on a current channel state. The UE receives and measures the second set of CSI-RSs to obtain corresponding equivalent channel state information, i.e., RI and/or PMI and/or CQI. Then the UE reports this equivalent channel state information to the base station as the second set of CSI. In this way, by using the first set of raw CSI-RSs to determine a channel state, and using the channel state to determine the second set of precoded CSI-RSs, the second set of CSI-RSs can be precoded suitably for the current channel state, and thus, CSI-RS transmission performance can be improved.

2. The base station is configured with multiple sets of CSI-RSs precoded differently. The UE measures respective CSI-RSs and selects a portion of CSI-RSs. Then the UE feeds back indexes of the selected CSI-RSs to the base station as the first set of CSI. The base station determines CSI-RSs corresponding to the indexes as the second set of CSI-RSs. When the UE measures the second set of CSI-RSs, the UE only measures the CSI-RSs corresponding to the indexes fed back, and feeds back a RI and/or a PMI and/or a CQI obtained by measurement to the base station as the second set of CSI. In this way, the UE can select signals beneficial for its transmission from multiple sets of CSI-RSs configured, so that the second CSI-RSs can be precoded suitably for the current channel state of the UE, and thus, CSI-RS transmission performance can be improved.

The technical scheme of the present disclosure will be further described in detail via the following several embodiments.

Embodiment 1

In this embodiment, a base station configures two sets of CSI-RSs for a UE, in which one set of CSI-RSs is not precoded, and the other is precoded. When the UE measures CSI of the second set of CSI-RSs, it needs to use CSI obtained by measuring the first set of CSI-RSs. For example, based on RI information of CSI obtained by measuring the first set of CSI-RSs, the UE may determine the number of valid CSI-RS ports in the second set of CSI-RSs, so that to measure CSI on the valid CSI-RS ports. To be specific, the UE may obtain a first set of periodic CSI based on measurement of the first set of periodic CSI-RSs, and report the first set of periodic CSI to the base station. Based on the first set of periodic CSI reported by the UE, the base station transmits the second set of CSI-RSs to the UE. The UE obtains a second set of periodic CSI based on measurement of the first set of periodic CSI reported by the UE and the second set of CSI-RSs transmitted from the base station, and then reports the second set of periodic CSI to the base station, as shown in FIG. 4. Here, the first set of periodic CSI may include at least one of the following: RI, PMI, or CQI, and the second set of periodic CSI may include at least one of the following: RI, PMI, or CQI. During foregoing CSI-RS transmissions and reporting of CSI information, CSI-RSs and CSI may both be reported or transmitted periodically or aperiodically.

For this situation, aperiodic CSI reporting method will be described in the following. First, different aperiodic CSI situations will be described. Aperiodic CSI may include the first set of CSI and/or the second set of CSI.

An aperiodic CSI situation is that aperiodic CSI does not include the first set of CSI, but only include the second set of CSI. In the following, a detailed aperiodic CSI reporting method under this situation will be described. The first set of CSI as the basis of the second set of CSI of aperiodic CSI reporting is a first set of periodic CSI of periodic CSI reporting, and CSI-RSs measured for aperiodic CSI reporting is the second set of CSI-RSs, as shown in FIG. 5.

Assume that aperiodic CSI reporting mentioned in the foregoing is performed in a subframe n. That is, the second set of CSI obtained by the UE after measurement is reported in the subframe n. The second set of CSI-RSs measured for aperiodic CSI reporting in the subframe n is in a subframe n-k, or is a nearest second set of CSI-RSs before the subframe n-k. That is, the second set of CSI-RSs is in a subframe n-k-m, where m is a positive integer larger than or equal to 0. K is a preset positive integer, and may be defined in protocols or configured by higher layer signaling. For example, a protocol defines k=4. The first set of periodic CSI as the basis of the second set of CSI of aperiodic CSI reporting is a nearest first set of periodic CSI is at least q subframes before the subframe n-k-m where the second set of CSI-RSs measured by the UE is located. That is, the first set of periodic CSI is a nearest first set of periodic CSI before subframe n-k-m-q. That is, the first set of periodic CSI is in a subframe nk-m-q-l, where l is a positive integer larger than or equal to 0, and q is a preset positive integer defined in protocols or configured by higher layer signaling. For example, a protocol defines q=4, as shown in FIG. 6.

Another aperiodic CSI situation is that aperiodic CSI not only includes the first set of CSI but also includes the second set of CSI. The UE may determine whether to perform aperiodic CSI reporting and which set of CSI will be reported this time according to indication information sent from the base station. To be specific, the UE may use a value of a CQI request field as indication information sent from the base station, e.g., using the following two ways.

1. A mapping relation between values of the CQI request field and driven CSI reporting is shown in Table 1.

TABLE 1

| Value of CQI request field | Description |
| --- | --- |
| '0' | No aperiodic CSI reporting |
| '1' | Reporting first set of CSI and second set of CSI |

According to the mapping relation in Table 1, when the value of the CQI request field is "0", aperiodic CSI reporting is not performed; when the value of the CQI request field is "1", it indicates performing aperiodic reporting, in which periodic CSI reported includes reporting of the first set of CSI and reporting of the second set of CSI. Of course, what are indicated corresponding to the values of the CQI request field described in the foregoing are only for example. The value of the CQI request field may be "0" to indicate performing aperiodic CSI reporting, and the value of the CQI request field may be "1" to indicate not performing aperiodic CSI reporting.

2. Another mapping relation between values of the CQI request field and driven CSI reporting is shown in Table 2.

TABLE 2

| Value of CQI request field | Description |
| --- | --- |
| '0' | No aperiodic CSI reporting |
| '1' | Aperiodic CSI reporting configured by higher layers |

According to the mapping relation in table 2, when the value of the CQI request field is "0", aperiodic CSI reporting is not performed, and when the value of the CQI request field is "1", aperiodic CSI reporting is performed, in which aperiodic CSI reporting may be configured by higher layers in advance. To be specific, aperiodic CSI reporting configured by the higher layers in the table 2 may only include the first set of CSI reporting, or may only include the second set of CSI reporting, but also may include the first set of CSI reporting and the second set of CSI reporting. What are indicated by the values of the CQI request field are only for example. The value of the CQI request field may be "0" to indicate performing aperiodic CSI reporting, and may be "1" to indicate not performing aperiodic CSI reporting.

In the following, another detailed aperiodic CSI reporting method under the aperiodic CSI situation will be described, in which aperiodic CSI reporting may include a first set of aperiodic CSI and/or a second set of aperiodic CSI. The first set of aperiodic CSI is obtained by measuring a first set of CSI-RSs. Assuming that the first set of aperiodic CSI is reported in a subframe n, then the first set of CSI-RSs measured for the first set of aperiodic CSI is in a subframe n-k, or is a nearest first set of CSI-RSs before the subframe n-k. That is, the first set of CSI-RSs is in a subframe n-k-m, where m is a positive integer larger than or equal to 0. K is a preset positive integer, and may be defined in protocols or configured by higher layer signaling. For example, a protocol defines k=4.

A method for reporting a second set of CSI of aperiodic CSI reporting is that a first set of CSI as a basis of the second set of CSI of aperiodic CSI reporting is a first set of periodic CSI of periodic CSI reporting, and CSI-RSs measured for aperiodic CSI reporting are a second set of CSI-RSs, as shown in FIG. 5.

Another method for reporting a second set of CSI of aperiodic CSI reporting is that a first set of CSI as a basis of the second set of CSI of aperiodic CSI reporting is a nearest first set of aperiodic CSI of aperiodic CSI reporting or first set of periodic CSI of periodic CSI reporting, and CSI-RSs measured for the second set of CSI of aperiodic CSI reporting are a second set of CSI-RSs. The second set of CSI-RSs is obtained according to a nearest first set of aperiodic CSI of aperiodic CSI reporting or first set of periodic CSI of periodic CSI reporting that meets a latency requirement, as shown in FIG. 7. That is, when a first set of CSI that meets the latency requirement and is nearest is a first set of CSI of periodic CSI reporting, then measurement is performed based on the first set of periodic CSI; and when the first set of CSI that meets the latency requirement and is nearest is a first set of CSI of aperiodic CSI reporting, then measurement is performed based on the first set of aperiodic CSI. Here, the first set of aperiodic CSI of aperiodic CSI reporting may be used for the second set of CSI-RSs for subsequent CSI reporting, and an interval between the first set of aperiodic CSI and the second set of CSI-RSs obtained based on the first set of aperiodic CSI may be larger than k frames, where k is a positive integer, may be defined in protocols or configured by higher layer signaling. For example, a protocol defines k=4. Between the first set of aperiodic CSI of aperiodic CSI reporting and the second set of CSI-RSs, there is no first set of periodic CSI having an interval of k frames with the second set of CSI-RSs.

Assume that reporting of the second set of aperiodic CSI mentioned in the foregoing is in a subframe n, and the second set of CSI-RSs measured for reporting of the second set of aperiodic CSI is in a subframe n-k or is a nearest second subset of CSI-RSs before the subframe n-k. That is, the second set of CSI-RSs is in a subframe n-k-m, where m is a positive integer larger than or equal to 0. K is a positive integer, and may be defined by protocols or configured by higher layer signaling. For example, a protocol defines k=4. The first set of CSI as a basis of the second set of aperiodic CSI of aperiodic CSI reporting is a first periodic CSI at least q subframes before the subframe n-k-m where the second set of CSI-RSs measured by the UE is located, or is the first set of aperiodic CSI. That is, the first set of aperiodic CSI is a nearest first set of aperiodic CSI before a subframe n-k-m-q. That is, the first set of aperiodic CSI is in a frame n-k-m-q-l, where l is a positive integer larger than or equal to 0, and q is a positive integer defined by protocols, or configured by higher layer signaling. For example, a protocol defines q=4, as shown in FIG. 8.

Embodiment 2

In this embodiment, a base station configures multiple sets of CSI-RSs for a UE, and different CSI-RSs are precoded using different precoding matrixes. During periodic CSI reporting, the UE first measures the multiple sets of CSI-RSs, selects one or more sets of CSI-RSs (e.g., selecting CSI-RSs with the best receiving performance), and sends an index or indexes of the one or multiple sets of CSI-RSs selected to the base station, which is referred to as a first set of periodic CSI. Subsequent CSI is obtained by measuring CSI-RSs having the index or indexes reported by the UE to the base station, and then the UE reports obtained CSI to the base station, which is referred to as a second set of periodic CSI. During aperiodic CSI reporting, an index or indexes of one or more sets of CSI-RSs selected by the UE is referred to as a first set of aperiodic CSI, and CSI reporting obtained based on the one or more sets of CSI-RSs is referred to as a second set of aperiodic CSI. The second periodic CSI reporting may be periodic CSI reporting obtained based on an index or indexes of the one or more sets of CSI-RSs selected according to the first set of aperiodic CSI reporting. To determine whether periodic CSI reporting is periodic CSI reporting obtained based on the index or indexes of the one or more sets of CSI-RSs selected from the first set of periodic CSI reporting, or based on the index or indexes of the one or more sets of CSI-RSs selected from the first set of aperiodic CSI reporting, a first set of periodic CSI reporting which is before and has an interval larger than or equal to k subframes with the second set of periodic CSI reporting and is nearest to the second set of CSI periodic reporting, or a second set of periodic CSI reporting obtained based on the index or indexes of the one or more sets of CSI-RSs selected from the first set of aperiodic CSI reporting may be used, as shown in FIG. 9.

As is seen from the foregoing, in the Embodiment 2, the base station configures multiple sets of CSI-RSs and corresponding indexes and precoding matrixes, and the first set of CSI-RSs sent by the base station is all configured CSI-RSs after being precoded. The first set of CSI is an index or indexes of one or more sets of CSI-RSs selected after measuring all the CSI-RSs; the second set of CSI-RSs is precoded CSI-RSs corresponding to the index or indexes included in the first set of CSI; and the second set of CSI is a RI and/or a PMI and/or CQI obtained after measuring the second set of CSI-RSs. After the first set of CSI-RSs and the second set of CSI-RSs are obtained as described in the foregoing, how the UE measures the first set of CSI-RSs to obtain the first set of CSI and measures the second set of CSI-RSs to obtain the second set of CSI may using a method similar to that in the Embodiment 1. That is, a time sequence of a subframe of aperiodic CSI reporting, a subframe for transmission of the second set of CSI-RSs, and a subframe for transmission of the first set of CSI-RSs may be the same with that in the Embodiment 1, and will not be elaborated herein.

In summary, when using the technical scheme of the present disclosure, since CSI-RSs are precoded, system performance can be improved, and resources occupied by the CSI-RSs can be largely saved in practical implementations, so that more downlink physical resources can be used for physical downlink shared channel (PDSCH) transmission, and thus throughput of downlink services is improved.

The foregoing are detailed implementations of channel state information reporting methods according to the present disclosure. The present disclosure further provides a channel state information reporting apparatus, configured to implement the methods. A schematic diagram of a basic structure of the apparatus is shown in FIG. 10, including a first set of CSI measuring and reporting unit, a storage unit, a second set of CSI measuring and reporting unit.

To be specific, the first set of CSI measuring and reporting unit is to measure a first set of CSI-RSs sent from a base station to obtain a first set of CSI, and report the first set of CSI obtained to the base station.

The storage unit is to save the first set of CSI obtained.

The second set of CSI measuring and reporting unit is to measure a second set of CSI-RSs sent from the base station based on the first set of CSI saved to obtain a second set of CSI, and report the second set of CSI obtained to the base station; the second set of CSI-RSs is precoded CSI-RSs determined based on the first set of CSI.

In the foregoing reporting apparatus, the first set of CSI and/or the second set of CSI may be reported to the base station as aperiodic CSI.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method for reporting channel state information (CSI), in a wireless system, the method comprising:
receiving a first set of channel state information-reference signals (CSI-RSs) transmitted from a base station to obtain a first set of CSI;
reporting the obtained first set of CSI to the base station;
receiving a second set of CSI-RSs transmitted from the base station based on the first set of CSI to obtain a second set of CSI; and
reporting the obtained second set of CSI to the base station,
wherein the second set of CSI-RSs is precoded CSI-RSs determined based on the first set of CSI.

2. The method of claim 1, wherein at least one of the first set of CSI or the second set of CSI to the base station is an aperiodic CSI.

3. The method of claim 2, wherein the first set of CSI-RSs is non-precoded CSI-RSs and the second set of CSI-RSs is CSI-RSs precoded using channel information determined from the first set of CSI, and
wherein the first set of CSI includes at least one rank indicator (RI), channel quality indicator (CQI), or precoding matrix indicator (PMI), and the second set of CSI includes at least one of the RI, the CQI, or the PMI.

4. The method of claim 2, wherein the first set of CSI-RSs transmitted by the base station includes multiple sets of CSI-RSs with corresponding indices which are precoded based on precoding matrixes respectively, and
wherein the first set of CSI is an index or indices of one or more sets of CSI-RSs selected by receiving the first set of CSI-RSs,
wherein the second set of CSI-RSs is precoded CSI-RSs corresponding to the index or the indices included in the first set of CSI, and
wherein the second set of CSI is at least one of an RI, a PMI or CQI obtained based on the second set of CSI-RSs.

5. The method of claim 2, wherein in a case that the second set of CSI is the aperiodic CSI and the first set of CSI is a periodic CSI, the reporting the obtained second set of CSI comprises:
obtaining the second set of CSI by measuring the second set of CSI-RSs in a subframe n-k or in a nearest subframe n-k-m in which the second set of CSI-RSs is transmitted before the subframe n-k, wherein the first set of CSI is reported in a subframe n-k-m-q or in a nearest subframe n-k-m-q-l in which the first set of CSI is reported before the subframe n-k-m-q; and reporting the second set of CSI in a subframe n as the aperiodic CSI, wherein n is an index of a subframe for reporting the second set of CSI, k is a preconfigured positive integer, m is a positive integer larger than or equal to 0, q is a preconfigured positive integer, and l is a positive integer larger than or equal to 0.

6. The method of claim 2, further comprising:
receiving an indicator indicating whether to perform aperiodic CSI reporting transmitted from the base station.

7. The method of claim 6, wherein in a case that the first set of CSI and the second set of CSI are the aperiodic CSI, the indicator is a value of a CQI request field, and
wherein in a case that the value of the CQI request field is a first value, the aperiodic CSI reporting is not performed and in a case that the value of the CQI request field is a second value, the aperiodic CSI reporting is performed.

8. The method of claim 6, wherein in a case that the first set of CSI is the aperiodic CSI, the reporting the obtained first set of CSI comprises:
receiving the first set of CSI-RSs which is transmitted in a subframe n-k or in a nearest subframe n-k-m in which the first set of CSI-RSs is transmitted before the subframe n-k, to obtain the first set of CSI; and
reporting the first set of CSI in a subframe n to the base station as the aperiodic CSI, wherein n is an index of a subframe to report the aperiodic CSI, k is a preconfigured positive integer, and m is a positive integer larger than or equal to 0.

9. The method of claim 6, wherein in a case that the second set of CSI is the aperiodic CSI, the reporting the obtained second set of CSI comprises:
obtaining and reporting the second set of CSI as the aperiodic CSI by measuring the first set of CSI periodically reported and the second CSI-RSs sent from the base station.

10. The method of claim 7, wherein in case that the first set of CSI and the second set of CSI are the aperiodic CSI, the reporting the obtained second set of CSI comprises:
obtaining the second set of CSI based on the second set of CSI-RSs transmitted in the subframe n-k or in a nearest subframe n-k-m in which the second set of CSI-RSs is transmitted before the subframe n-k, wherein the first set of CSI is reported in a subframe n-k-m-q or a nearest subframe n-k-m-q-l in which the first CSI is reported before the subframe n-k-m-q among all first sets of CSI reported periodically or aperiodically; and
reporting the second set of CSI in a subframe n as the aperiodic CSI, wherein n is an index of a subframe to report the aperiodic CSI, k is a preconfigured positive integer, m is a positive integer larger than or equal to 0, q is a preconfigured positive integer, and l is a positive integer larger than or equal to 0.

11. An apparatus for reporting channel state information (CSI) in a wireless communication system, the apparatus comprising:
a transceiver; and
at least one processor configured to:
receive a first set of channel state information-reference signals (CSI-RSs) transmitted from a base station to obtain a first set of CSI;
report the obtained first set of CSI to the base station;
receive a second set of CSI-RSs transmitted from the base station based on the first set of CSI to obtain a second set of CSI; and
report the obtained second set of CSI to the base station,
wherein the second set of CSI-RSs is precoded CSI-RSs determined based on the first set of CSI.

12. The apparatus of claim 11, wherein at least one of the first set of CSI or the second set of CSI to the base station is an aperiodic CSI.

13. The apparatus of claim 12, wherein the first set of CSI-RSs is non-precoded CSI-RSs and the second set of CSI-RSs is CSI-RSs precoded using channel information determined from the first set of CSI, and
wherein the first set of CSI includes at least one rank indicator (RI), channel quality indicator (CQI), or precoding matrix indicator (PMI), and the second set of CSI includes at least one of the RI, the CQI, or the PMI.

14. The apparatus of claim 12, wherein the first set of CSI-RSs transmitted by the base station includes multiple sets of CSI-RSs with corresponding indices which are precoded based on precoding matrixes, respectively,
wherein the first set of CSI is an index or indices of one or more sets of CSI-RSs selected by receiving the first set of CSI-RSs,
wherein the second set of CSI-RSs is precoded CSI-RSs corresponding to the index or the indices included in the first set of CSI, and
wherein the second set of CSI is at least one of an RI, a PMI or CQI obtained based on the second set of CSI-RSs.

15. The apparatus of claim 12, wherein in a case that the second set of CSI is the aperiodic CSI and the first set of CSI is a periodic CSI, the at least one processor is further configured to:
obtain the second set of CSI by measuring the second set of CSI-RSs in a subframe n-k or in a nearest subframe n-k-m in which the second set of CSI-RSs is transmitted before the subframe n-k, wherein the first set of CSI is reported in a subframe n-k-m-q or in a nearest subframe n-k-m-q-l in which the first set of CSI is reported before the subframe n-k-m-q, and
report the second set of CSI in a subframe n as the aperiodic CSI, wherein n is an index of a subframe for reporting the second set of CSI, k is a preconfigured positive integer, m is a positive integer larger than or equal to 0, q is a preconfigured positive integer, and l is a positive integer larger than or equal to 0.

16. The apparatus of claim 12, wherein the at least one processor is further configured to receive an indicator indicating whether to perform aperiodic CSI reporting transmitted from the base station.

17. The method of claim 16, wherein in a case that the first set of CSI and the second set of CSI are the aperiodic CSI, the indicator is a value of a CQI request field, and
wherein in a case that the value of the CQI request field is a first value, the aperiodic CSI reporting is not performed and in a case that the value of the CQI request field is a second value, the aperiodic CSI reporting is performed.

18. The apparatus of claim 16, wherein in a case that the first set of CSI is the aperiodic CSI, the at least one processor is further configured to:
receive the first set of CSI-RSs which is transmitted in a subframe n-k or in a nearest subframe n-k-m in which the first set of CSI-RSs is transmitted before the subframe n-k, to obtain the first set of CSI, and report the first set of CSI in a subframe n to the base station as the aperiodic CSI, wherein n is an index of a subframe to report the aperiodic CSI, k is a preconfigured positive integer, and m is a positive integer larger than or equal to 0.

19. The apparatus of claim 16, wherein in a case that the second set of CSI is the aperiodic CSI, the at least one processor is configured to:
   obtain and report the second set of CSI as the aperiodic CSI by measuring the first set of CSI periodically reported and the second CSI-RSs sent from the base station.

20. The apparatus of claim 17, wherein in a case that the first set of CSI and the second set of CSI are the aperiodic CSI, the at least one processor is further configured to:
   obtain the second set of CSI based on the second set of CSI-RSs transmitted in the subframe n-k or in a nearest subframe n-k-m in which transmits the second set of CSI-RSs is transmitted before the subframe n-k, wherein the first set of CSI is reported in a subframe n-k-m-q or a nearest subframe n-k-m-q-l in which the first CSI is reported before the subframe n-k-m-q among all first sets of CSI reported periodically or aperiodically, and
   report the second set of CSI in a subframe n as the aperiodic CSI, wherein n is an index of a subframe to report the aperiodic CSI, k is a preconfigured positive integer, m is a positive integer larger than or equal to 0, q is a preconfigured positive integer, and l is a positive integer larger than or equal to 0.

* * * * *

UNITED STATES PATENT AND TRADEMARK OFFICE
CERTIFICATE OF CORRECTION

| | | |
|---|---|---|
| PATENT NO. | : 10,555,194 B2 | Page 1 of 1 |
| APPLICATION NO. | : 15/735382 | |
| DATED | : February 4, 2020 | |
| INVENTOR(S) | : Jingxing Fu et al. | |

It is certified that error appears in the above-identified patent and that said Letters Patent is hereby corrected as shown below:

On the Title Page

Column 1:
"(71) Applicants: Samsung Electronics Co., Ltd., Gyeonggi-do (KR); BEIJING SAMSUNG TELECOMMUNICATIONS TECHNOLOGY RESEARCH CO., LTD., Beijing (CN)"

Should be:
--(71) Applicants: Samsung Electronics Co., Ltd., Gyeonggi-do (KR)--.

Signed and Sealed this
Tenth Day of March, 2020

Andrei Iancu
*Director of the United States Patent and Trademark Office*